July 9, 1929. T. APPLEBY 1,719,956
METHOD OF AND APPARATUS FOR PRODUCING OSCILLATIONS
Filed March 21, 1921
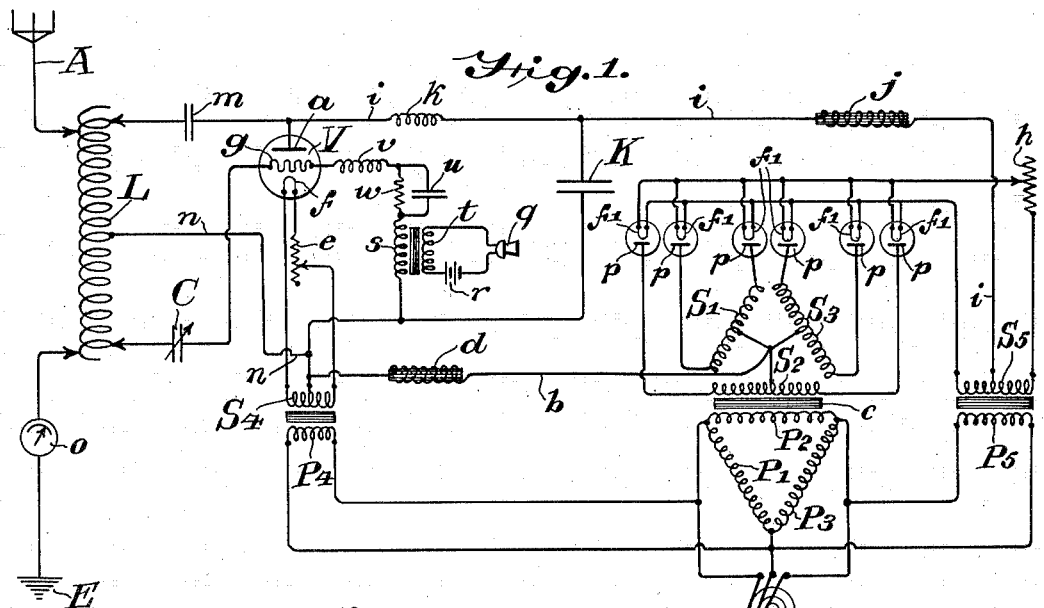
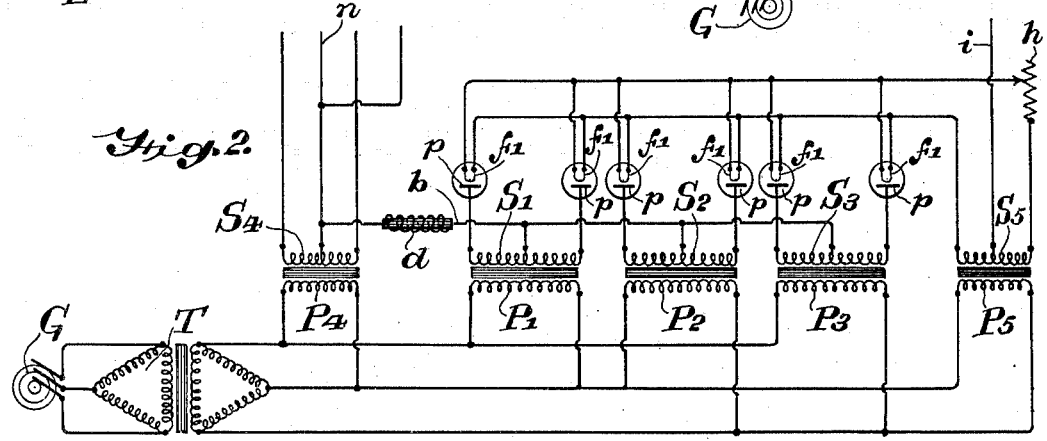
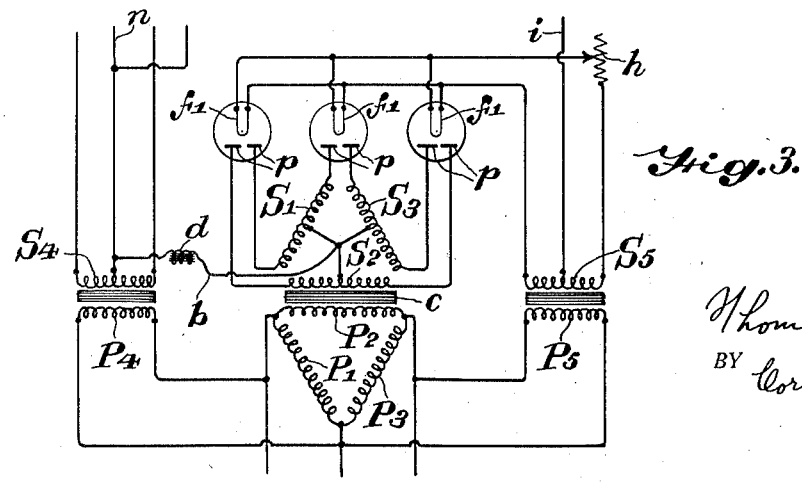
INVENTOR.
Thomas Appleby
BY Cornelius D. Ehret
his ATTORNEY.

Patented July 9, 1929.

1,719,956

UNITED STATES PATENT OFFICE.

THOMAS APPLEBY, OF PHILADELPHIA, PENNSYLVANIA, ASSIGNOR, BY DIRECT AND MESNE ASSIGNMENTS, TO ARTHUR ATWATER KENT, OF ARDMORE, PENNSYLVANIA.

METHOD OF AND APPARATUS FOR PRODUCING OSCILLATIONS.

Application filed March 21, 1921. Serial No. 453,988.

My invention relates to a method of and apparatus for producing electrical oscillations, more particularly high frequency oscillations such as are employed in radio systems or in carrier wave systems employing one or more conductors extending between transmitting and receiving stations.

In accordance with my invention, polyphase current is rectified, and the rectified current supplied to an oscillator; and more particularly the rectified polyphase current is delivered to a thermionic oscillator.

My invention resides in the method and apparatus hereinafter described and claimed.

For an understanding of my method and for an illustration of some of the arrangements my apparatus may take, reference may be had to the accompanying drawing, in which:

Fig. 1 is a diagrammatic view of apparatus embodying my invention.

Figs. 2 and 3 are fragmentary diagrammatic views of modifications.

Referring to Fig. 1, G represents a source of polyphase current, the number of phases being two or more, and in the example illustrated three phases, it being understood that any suitable greater number of phases is comprehended within my invention. The frequency of the polyphase current may be anything suitable or desirable, for example, a commercial frequency, as 60 cycles per second; it will be understood, however, that higher frequency current may be employed, as for example, upwards to 500 cycles or more per second. In circuit with the generator G are the primaries $P^1$, $P^2$ and $P^3$ of a three phase transformer whose secondaries are indicated at $S^1$, $S^2$ and $S^3$, the core structure, generically indicated at $c$, being of any suitable type corresponding with the number of phases involved. This transformer is preferably a step-up transformer whereby the secondary voltage is higher than the primary voltage. For example, the primary voltage may be any commercial voltage, as 110 volts, or any other suitable voltage. The secondary voltage may be anything desirable and suited to the oscillator to be supplied with the rectified current. For example, the secondary voltage may be of any suitable magnitude and may be several thousands of volts. For example, the secondary voltage may be 10,000 volts or higher for high powered thermionic oscillators. The substantially mid points of the secondaries are connected together and communicate through the conductor $b$ and low frequency choke coil $d$ with the mid point of the secondary $S^4$ of a transformer whose primary $P^4$ is supplied by current from one of the phases of the source G. The secondary $S^4$ delivers current through the variable resistance $e$ to the filament or cathode $f$ of the thermionic device V comprising a tube or bulb evacuated to any suitable degree and containing in addition to the cathode $f$ the grid $g$ and the wing or anode $a$. Each terminal of the secondaries $S^1$, $S^2$ and $S^3$ is connected to a plate or anode $p$ of a thermionic device comprising a bulb or tube evacuated to suitable degree and containing also a filament or heated cathode $f^1$. The filaments $f^1$ are supplied with heating current through the adjustable resistance $h$ by the secondary $S^5$ of a transformer whose primary $P^5$ is supplied by current from one of the phases of a source G, it being understood that the primaries $P^4$ and $P^5$ may be connected in the same phase, or in different phases as indicated, as may be suitable or desirable.

The transformers whose primaries are $P^4$ and $P^5$ will ordinarily be step-down transformers, though it will be understood that my invention is not limited in this regard. From the mid point of the secondary $S^5$ connection is made by conductor $i$ through the low frequency choke coil $j$ and the radio frequency choke coil $k$ with the anode $a$ of the vacuum tube or thermionic device V.

The anode, cathode and grid of the device V may be connected in any suitable way with capacity and inductance for setting up oscillations of any suitable or desired frequency, many modes of connection for oscillation production by thermionic devices being well understood in the art. In the example illustrated, the anode $a$ is connected through the low frequency stop condenser $m$ with a variable point upon the inductance coil or winding L. The grid $g$ is connected through the variable condenser C with a variable point upon the inductance L, whose mid or other point is connected by conductor $n$ with the mid point of the secondary $S^4$. The inductance L is associated in any suitable or known way with the radiating circuit or path of a radio system. In the example illustrated, a variable portion of the inductance L is included between the antenna or radiating conductor A and earth or counter-capacity E, a radiation meter or ammeter $o$ being included if desired.

It will be understood, however, that the energy of the oscillations may be impressed upon a line conductor or conductors of a carrier wave system of telephony or telegraphy, or may be utilized for any other purpose.

In the example illustrated, the apparatus constitutes a transmitter for radio telephony. The microphone $q$ and the source of current or battery $r$ are in the circuit of the primary $t$ of a modulation transformer whose secondary $s$ has its one terminal connected to the mid point of the secondary $S^4$ and its other terminal connected to the grid $g$ through the condenser $u$ and the radio frequency choke coil $v$. The condenser $u$ is shunted by a grid leak resistance $w$.

Connected across the anode $a$ and filament or hot cathode $f$ is the large storage condenser K.

The operation is as follows:

The filaments or cathodes $f$ and $f^1$ are traversed by current which raises them to incandescence, the degree of incandescence being adjustable or controllable by the rheostats $e$ and $h$. It will be understood, however, that these filaments may be heated by other current, as for example, current from a storage battery or the like. The rectifiers $p$, $f^1$ allow passage of current in one direction only from the secondaries $S^1$, $S^2$ and $S^3$, the direction of current being from an anode $p$ to a cathode $f^1$ and thence through conductor $i$ to the anode $a$ of the thermionic device V, to the cathode $f$ of that device, and thence by conductor $b$ to the common connection to the secondaries $S^1$, $S^2$, $S^3$.

There is accordingly delivered to the anode circuit of the thermionic device V numerous overlapping uni-directional impulses of current, energy of these impulses being converted into oscillations existing in or traversing the inductance L, from which they are impressed upon the radiating system or conductor A. There normally exist then continuous high frequency oscillations in the antenna A, whose fluctuations in amplitude are unimportant or negligible, such fluctuations in amplitude being maintained suitably low by the choke coils $j$ and $d$, and the condenser K. Upon speaking into the microphone $q$, the potential of the grid $g$ will vary in accordance with sound waves or speech, causing modulation of the high frequency oscillations by variation of amplitude by and in accordance with speech or sound waves. The radiated or transmitted energy, therefore, is modulated in accordance with sound waves or speech.

The apparatus may also be employed for purposes of telegraphy, in which case the telegraphic key will interrupt the continuity of the sustained oscillations in accordance with telegraphic characters. Such key may be connected in any suitable position or place, as well understood in the art.

The arrangement in Fig. 2 is similar to that in Fig. 1, except that in place of a three phase transformer, three separate single phase transformers are employed, these having the primaries $P^1$, $P^2$ and $P^3$ connected in the different phases of the circuit supplied from the three phase generator G through a three phase transformer T, if desired, or the generator G may be connected directly to the primaries $P^1$, $P^2$ and $P^3$ by omitting the transformer T. The secondaries $S^1$, $S^2$ and $S^3$ are connected as before to the rectifiers $p$, $f^1$, and their mid points connected to conductor $b$, which communicates through the choke coil $d$ with the mid point of the filament transformer whose secondary is $S^4$.

In Fig. 3 the arrangement is similar to that shown in Fig. 1, except that the rectifiers are reduced in number by half, each vacuum tube or bulb having therein a filament or cathode $f^1$ and two plates or anodes $p$, the anodes in each bulb being connected, however, to different secondaries or different phases.

By the arrangements above described, the polyphase current is rectified externally to the oscillator and supplied thereto as overlapping uni-directional current impulses.

It will be understood that my invention is not limited to the particular circuit arrangements or connections, nor is it limited as regards the voltages or number of phases employed, except that the number of phases shall be two or more.

As to the arrangement of the rectifiers in Fig. 3, it will be understood that the two anodes $p$ of each bulb may be connected respectively to the opposite terminals of the same secondary.

It will further be understood of all figures that the number of anodes per bulb may be made anything suitable or desirable. In fact, all the anodes may be placed in one and the same evacuated bulb, and only one or any number of cathodes $f^1$ employed therewith.

For brevity it shall be understood with regard to the appended claims that the term "polyphase" therein appearing is limited to two or more alternating electro-motive-forces or currents differing in phase other than zero or 180 degrees, and therefore overlapping each other.

What I claim is:

1. Apparatus for producing oscillations comprising a thermionic oscillator having an anode and a filament cathode, a transformer secondary in whose circuit said filament is connected, a plurality of asymmetrical thermionic resistances comprising anodes and filament cathodes a transformer secondary supplying current to said cathodes, a connection from the mid point of said last named secondary to the anode of said oscillator, and polyphase secondary windings having their mid points connected to the mid point of said first named secondary and having their terminals connected to the anodes of said asymmetrical resistances.

2. Radio telephone transmitting apparatus comprising a source of polyphase alternating current, thermionic means comprising anode, cathode and control electrode structures, connections forming anode and control electrode circuits, asymmetrical thermionic impedances for the different phases disposed externally to the asymmetrical thermionic impedance between said anode and cathode structures for delivering thereto in succession and uni-directionally current waves from the different phases, means for varying the potential impressed upon said control electrode circuit at high frequency, and means for independently varying at audio frequency the potential of said control electrode structure.

3. Radio telephone transmitting apparatus comprising a source of polyphase alternating current, thermionic means comprising anode, cathode and control electrode structures, connections forming anode and control electrode circuits, a pair of asymmetrical thermionic impedances for each phase disposed externally to the asymmetrical thermonic impedance between said anode and cathode structures for delivering thereto in succesison and uni-directionally the current waves of both signs from each phase, means for varying the potential impressed upon said control electrode circuit at high frequency, and means for independently varying at audio frequency the potential of said control electrode structure.

4. Radio telephone transmitting apparatus comprising a source of polyphase alternating current, thermionic means comprising anode, cathode and control electrode structures, connections forming anode and control electrode circuits, asymmetrical thermionic impedances for the different phases and connected in parallel with each other externally to the asymmetrical thermionic impedance between said anode and cathode structures for delivering thereto in succession and uni-directionally current waves from the different phases, means for varying the potential impressed upon said control electrode circuit at high frequency, and means for independently varying at audio frequency the potential of said control electrode structure.

5. Radio telephone transmitting apparatus comprising a source of polyphase alternating current, thermionic means comprising anode, cathode and control electrode structures, connections forming anode and control electrode circuits, a pair of asymmetrical thermionic impedances for each phase connected in parallel with each other and with the pairs of impedances for the other phases externally to the thermionic impedance between said anode and cathode structures for delivering thereto in succession and uni-directionally in overlapping relation both current waves from each phase, means for varying the potential impressed upon said control electrode circuit at high frequency, and means for independently varying at audio frequency the potential of said control electrode structure.

6. Radio telephone transmitting apparatus comprising a source of polyphase alternating current, thermionic means comprising anode, cathode and control electrode structures, connections forming anode and control electrode circuits, asymmetrical thermionic impedances for the different phases disposed externally to the asymmetrical thermionic impedance between said anode and cathode structures for delivering thereto in succession and uni-directionally current waves from the different phases, low frequency inductance intervening between said impedances and the impedance between said anode and cathode structures, means for varying the potential impressed upon said control electrode circuit at high frequency, and means for independently varying at audio frequency the potential of said control electrode structure.

7. Radio telephone transmitting apparatus comprising a source of polyphase alternating current, thermionic means comprising anode, cathode and control electrode structures, connections forming anode and control electrode circuits asymmetrical thermionic impedances for the different phases disposed externally to the asymmetrical thermionic impedance between said anode and cathode structures for delivering thereto in succession and uni-directionally current waves from the different phases, a smoothing capacity connected across said anode and cathode structures, means for varying the potential impressed upon said control electrode circuit at high frequency, and means for independently varying at audio frequency the potential of said control electrode structure.

8. Radio telephone transmitting apparatus comprising a source of polyphase alternating current, thermionic means comprising anode, cathode and control electrode structures, connections forming anode and control electrode circuits, asymmetrical thermionic impedances for the different phases disposed externally to the asymmetrical thermionic impedance between said anode and cathode structures for delivering thereto in succession and uni-directionally current waves from the different phases, a high frequency inductive reactance intervening between said impedances and the impedance between said anode and cathode structures, means for varying the potential impressed upon said control electrode circuit at high frequency, and means for independently varying at audio frequency the potential of said control electrode structure.

9. The method of operating and controlling thermionic means comprising anode, cathode and control electrode structures with connections forming anode and control electrode circuits, which comprises generating a polyphase alternating current, selecting by asymmetrical thermionic impedances externally to the asymmetrical thermionic impedance between said anode and cathode structures half waves of current from the different phases, passing them uni-directionally and in succession to said anode circuit, and impressing upon the control electrode structure a potential varying at high and audio frequencies.

10. The method of operating and controlling thermionic means comprising anode, cathode and control electrode structures with connections forming anode and control electrode circuits, which comprises generating a polyphase alternating current, selecting by a pair of asymmetrical thermionic impedances per phase externally to the asymmetrical thermionic impedance between said anode and cathode structures current waves of both signs from each phase, passing them uni-directionally in succession in overlapping relation to said anode circuit, and impressing upon the control electrode structure a potential varying at high and audio frequencies.

11. The combination with thermionic means comprising anode, cathode and control electrode structures, of connections forming anode and control electrode circuits, a source of polyphase alternating current, asymmetrical thermionic impedances for the different phases disposed externally to the asymmetrical thermionic impedance between said anode and cathode structures for delivering thereto in succession and uni-directionally current waves from the different phases, and means for impressing upon the control electrode structure a potential varying at high and audio frequencies.

12. The combination with thermionic means comprising anode, cathode and control electrode structures, of connections forming anode and control electrode circuits, a source of polyphase alternating current, a pair of asymmetrical thermionic impedances for each phase disposed externally to the asymmetrical thermionic impedance between said anode and cathode structures for delivering thereto in succession and uni-directionally the current waves of both signs from each phase, and means for impressing upon the control electrode structure a potential varying at high and audio frequencies.

13. The combination with thermionic means comprising anode, cathode and control electrode structures, of connections forming anode and control electrode circuits, a source of polyphase alternating current, asymmetrical thermionic impedances for the different phases disposed externally to the asymmetrical thermionic impedance between said anode and cathode structures for delivering thereto in succession and unidirectionally current waves from the different phases, means for impressing upon the control electrode structure a potential varying at high and audio frequencies, a radiating structure, and means for impressing thereon high frequency energy corresponding with the high frequency component of the current in said anode circuit.

14. The combination with thermionic means comprising anode, cathode and control electrode structures, of connections forming anode and control electrode circuits, a source of polyphase alternating current, a pair of asymmetrical thermionic impedances for each phase disposed externally to the asymmetrical thermionic impedance between said anode and cathode structures for delivering thereto in succession and uni-directionally the current waves of both signs from each phase, means for impressing upon the control electrode structure a potential varying at high and audio frequencies, a radiating structure, and means for impressing thereon high frequency energy corresponding with the high frequency component of the current in said anode circuit.

In testimony whereof I have hereunto affixed my signature this 19th day of March, 1921.

THOMAS APPLEBY.